(12) United States Patent
Shepherd

(10) Patent No.: US 8,439,331 B2
(45) Date of Patent: May 14, 2013

(54) MANHOLE COVER EXTRACTOR

(76) Inventor: Alan Byron Shepherd, Albuquerque, NM (US)

( * ) Notice: Subject to any disclaimer, the term of this patent is extended or adjusted under 35 U.S.C. 154(b) by 7 days.

(21) Appl. No.: 12/659,833

(22) Filed: Mar. 22, 2010

(65) Prior Publication Data

US 2011/0133140 A1    Jun. 9, 2011

Related U.S. Application Data

(60) Provisional application No. 61/267,022, filed on Dec. 5, 2009.

(51) Int. Cl.
*B66F 13/00* (2006.01)
*B66F 3/00* (2006.01)
*B62B 1/06* (2006.01)
*B66F 11/00* (2006.01)

(52) U.S. Cl.
USPC .............................. 254/131; 254/1; 414/449

(58) Field of Classification Search .................. 254/131, 254/1; 414/449, 25, 607, 684.3
See application file for complete search history.

(56) References Cited

U.S. PATENT DOCUMENTS

| | | | | |
|---|---|---|---|---|
| 2,846,259 A * | 8/1958 | Sadler | ............................. | 294/15 |
| 3,152,708 A * | 10/1964 | Agesen | ......................... | 414/449 |
| 4,365,925 A * | 12/1982 | Girtz | ........................... | 414/684.3 |
| 4,488,706 A * | 12/1984 | Kono | ............................ | 254/131 |
| 4,512,554 A * | 4/1985 | Racine | ........................... | 254/131 |
| 4,662,607 A * | 5/1987 | Mochizuki et al. | ........... | 254/131 |
| 4,826,388 A * | 5/1989 | Golding | ...................... | 414/684.3 |
| 4,872,694 A * | 10/1989 | Griesinger | .................. | 280/79.4 |
| 4,991,893 A * | 2/1991 | Gordon et al. | .................. | 294/17 |
| 5,292,107 A * | 3/1994 | Chick | ........................... | 254/131 |
| 5,462,385 A * | 10/1995 | Mohlengraft | ................... | 404/25 |
| 5,775,674 A * | 7/1998 | Bigham | ....................... | 254/131 |
| 5,944,370 A * | 8/1999 | Ravet et al. | ...................... | 294/74 |
| 6,202,985 B1 * | 3/2001 | Chong et al. | ................... | 254/131 |
| 6,431,523 B2 * | 8/2002 | Goldman | ......................... | 254/1 |
| 6,520,482 B1 * | 2/2003 | Bigham | ....................... | 254/131 |
| 6,945,742 B2 * | 9/2005 | Roberts | ........................ | 414/449 |
| 7,293,759 B2 * | 11/2007 | Beach et al. | .................. | 254/131 |
| 7,544,035 B1 * | 6/2009 | Friedrich | ................... | 414/684.3 |
| 2002/0179891 A1 * | 12/2002 | Schuller et al. | ............... | 254/131 |
| 2004/0042886 A1 * | 3/2004 | Roberts | ........................ | 414/607 |

* cited by examiner

*Primary Examiner* — Lee D Wilson
*Assistant Examiner* — Alvin Grant
(74) *Attorney, Agent, or Firm* — Janeen Vilven; Peacock Myers, P.C.

(57) ABSTRACT

A manhole cover extractor that pulls and lifts weighty horizontal items such as manhole covers and handhold enclosure covers that are lifted perpendicular from one side and pulled from the original position, removed and on same plane able to lift and move cover back to the original setting or simply move cover as to not create a tripping hazard; the tool consists of a T-bar which gives the necessary fulcrum for effortless removal and management of cumbersome manhole covers, the T-bar is comprised with handles to control the load. A polypropylene strap which is doubled back with reinforced cross stitching and J-hook which engages the object(s) listed and the aforementioned polypropylene strap is docked to the T-bar handle. Pneumatic all-terrain tires that are attached to an axle that is secured to the T-bar handle through the A-frame of the dolly.

8 Claims, 2 Drawing Sheets

MANHOLE COVER EXTRACTOR

CROSS REFERENCE TO RELATED APPLICATIONS

This application is a Division of Application Ser. No. 61/267,022 filed on Dec. 5, 2009. This application claims Priority of Patent Application Ser. No. 61/267,022 filed on Dec. 5, 2009.

STATEMENT REGARDING FEDERALLY SPONSORED R & D

NOT APPLICABLE

NAMES OF PARTIES TO A JOINT RESEARCH AGREEMENT

NOT APPLICABLE

BACKGROUND OF THE INVENTION

1. Field of the Invention

The present invention relates to an extraction tool for removal of manhole covers and handhold enclosure covers up to 18 inches in width. This hand tool simply lifts one side perpendicularly from the original seat through foot pressure at the axle for stability and a pulling motion towards the operator of the extractor, by means of T-bar handles and with minimal effort lifts cover and able to remove cover from working area, consequently not creating a tripping hazard in the region of the newly created hole. To reinstall movement of the cover is relatively the same process; engage and rest cover against lower unit and continuous motion downward as this extractor picks the cover and will allow replacement or movement of cover with minimal effort.

2. Description of the Prior Art

Manhole covers in addition to handhold enclosures covers are used for accessing a variety of utilities, but they all do at some point have a cover for entrance. Manhole covers and their openings are not standardized throughout North America and create a challenge and risk of injury with every cover removed. Manholes located in vehicle traffic areas create a hazardous environment, there is a likelihood of deadly gases in each confined space of the manhole, thus the need to eliminate the frustration involved with the manhole covers and allow the focus of the real dangers associated with manholes.

U.S. Pat. Nos. 4,365,925 and 6,520,482B1 describes a method and an apparatus for removing manhole covers and handhold enclosure covers. This equipment is limited to either lifting the cover from the center of the cover which greatly diminishes the fulcrum necessary for ease of breaking a sealed cover through years of asphalt and debris or with the small wheels allow for manhole covers to be moved only on asphalt or concrete type roadways, in that all manhole covers and or handhole enclosure covers are not always embedded in roadways but also dirt and otherwise unimproved site conditions. None addresses handhold enclosure covers, that are as cumbersome and heavy due in their composition of concrete, creating as much of a challenge removing and handling as the steel manhole covers.

SUMMARY OF THE INVENTION

The present invention is a manhole cover extractor and capable of extracting handhole enclosure covers up to 18 inches in width (with adapter necessary for handhold covers). It is capable of removing the cover and once out of the seat and on the same plane, able to lift the cover and move it out of work area by pulling or picking the cover up and relocating the cover without the inconvenience of moving these cumbersome and heavy objects manually.

It is therefore the primary object of this present invention to provide a manhole cover extractor or handhole enclosure extractor the capability to eliminate downtime due to broken fingers and pulled muscles from removing these covers manually.

It is another object of the present invention to provide manhole cover and handhole enclosure cover extractor the capability to perform on any surface with the pneumatic all-terrain tires.

It is further object of the present invention to provide a manhole cover extractor and handhole enclosure cover extractor to reduce the man hours removing a cover that is unmoving due to an accumulation of asphalt, dirt, and debris.

It is still another object of the present invention to provide a manhole cover and handhole enclosure cover extractor a conveniently portable tool that meets the durability and manageability needed for repetitive every day usage.

These and other objects of the present invention, will become apparent to those skilled in this art upon reading the accompanying description, drawings, and claims set forth herein.

DETAILED DESCRIPTION OF THE INVENTION

Figure 1:
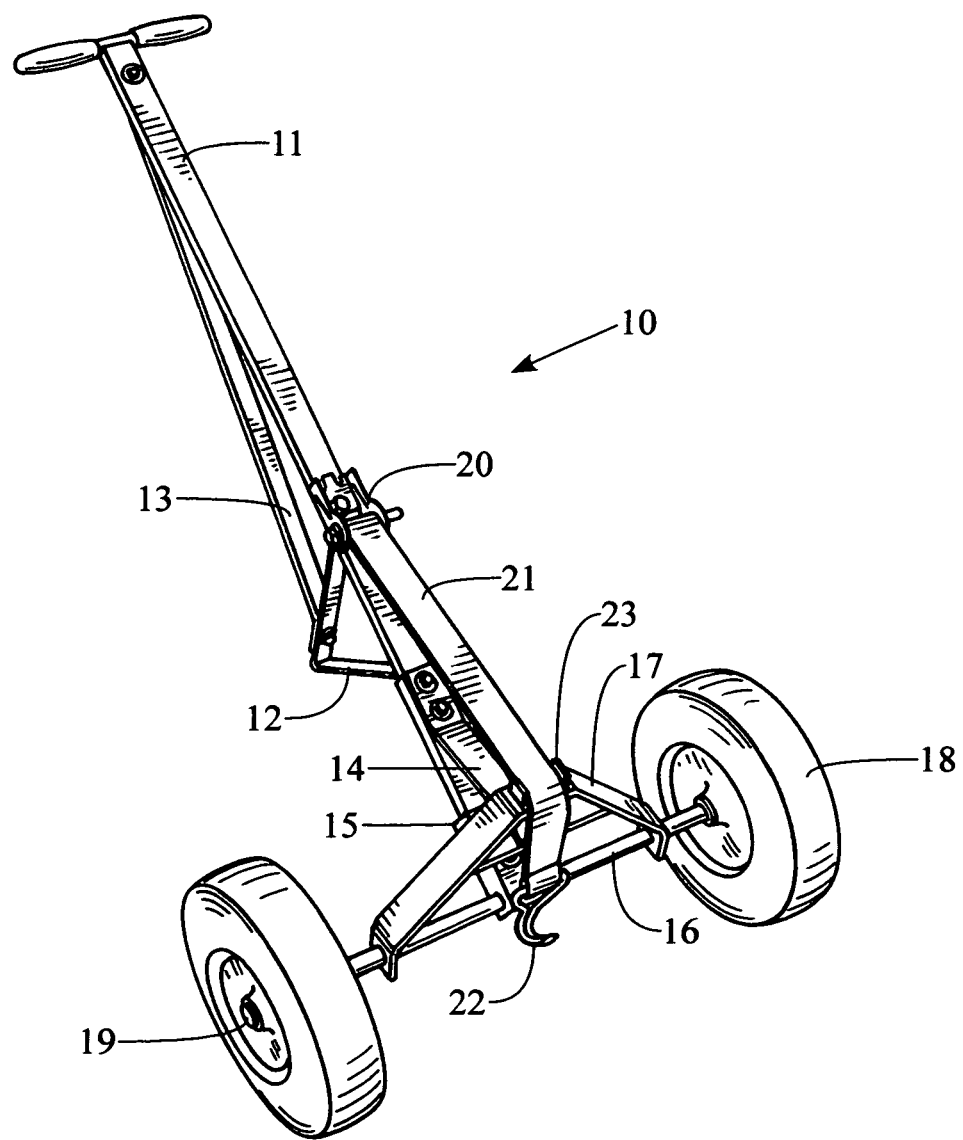
FIG. 1 is a top section view of the manhole cover and handhole enclosure cover extractor according to the present invention.
Figure 2:
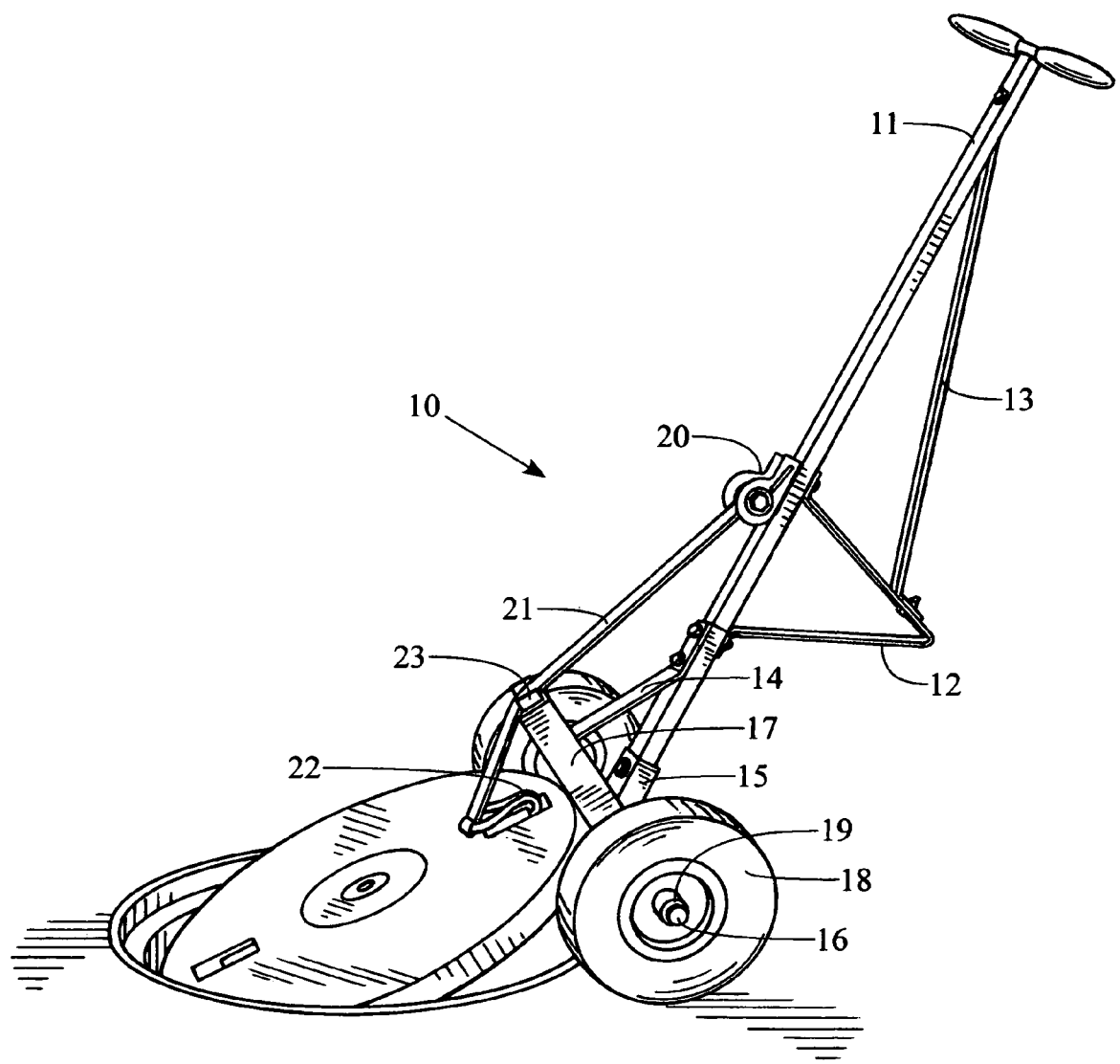
FIG. 2 is a side section view of the manhole cover and handhole enclosure cover extractor according to the present invention.

FIG. 1 shows a top sectional view of the best mode Contemplated by the inventor of the manhole cover and handhole enclosure cover extractor 10 according to the concepts of the present invention. As can be amply seen from the drawings the manhole cover and handhole cover extractor 10 and includes the referenced T-bar assembly 11 made of a thin wall channel tubing consisting of welded handles and rubber grips for secure handling, giving the extractor the fulcrum for popping and consequently movement of covers. The T-bar sits inclined from stand 12 which acts as gusset as is 13 giving the T-bar rigidity, both 12 and 13 are bolted to T-bar. A stiffening bar 14 is bolted to the T-bar 11 giving inflexibility to lower unit 15 which is through bolted to T-bar 11.

Lower unit 15 is a U channel that incorporates the axle 16 that is welded and the A frame 17 which is welded to axle 16. Lower unit 15 is subsequently bolted from A-frame 17 through stiffening bar 14 that is through bolted to T-bar 11, giving rigidity necessary for heavy loads. Lower unit 17 also incorporates all-terrain tires 18 that are seated on the axle 16 and secured by retaining washer 19 and cotter pinned.

Strap dock 20 is through bolted to T-bar 11 and stand 12 and polypropylene strap 21 is doubled back and reinforced cross stitched to allow bolt for attachment to strap dock 20. Metal hook 22 which engages manhole cover or accessory necessary for a hole provided in manhole covers for extraction or opening typical on handhole covers, is attached to polypropylene strap 21 by doubling back with reinforced cross stitching. Polypropylene strap guide 23 bolted on A-frame 17 keeping polypropylene strap in alignment with T-bar handle 11.

Thus it will be appreciated by those skilled in the art that the present invention is not restricted to the particular preferred embodiments described with the reference to the drawings, and that variations may be made therein without departing from the scope of the present invention as defined in the appended claims and equivalents thereof.

What is claimed is:

1. A portable manhole cover and handhold enclosure cover extractor comprising:
    a T-bar handle;
    a strap-dock through-bolted to said T-bar handle, a stand, and a first end of a strap;
    said strap doubled back and reinforced to said strap-dock;
    said strap disposed over an A-frame;
    a J-hook disposed on a second end of said strap; and
    said A-frame comprising two members meeting at a top point and forming an apex and a cross-member between said two members, both of said two members disposed about an axle and positioned inside two wheels on said axle.

2. The portable manhole cover and handhold enclosure cover extractor of claim 1 further comprising a strap guide attached to said A-frame.

3. The portable manhole cover and handhold enclosure cover extractor of claim 1 further comprising a gusset disposed on said T-bar handle for added rigidity.

4. The portable manhole cover and handhold enclosure cover extractor of claim 1 wherein said strap comprises cross stitching.

5. The portable manhole cover and handhold enclosure cover extractor of claim 1 wherein said wheels comprise all terrain tires.

6. The portable manhole cover and handhold enclosure cover extractor of claim 1 wherein said strap comprises elasticity.

7. The portable manhole cover and handhold enclosure cover extractor of claim 1 wherein said J-hook is attached to said strap via double-backed with reinforce cross stitching.

8. A method of repositioning a manhole cover or a handhold enclosure cover using the portable manhole cover and handhold enclosure cover extractor of claim 6 comprising:
    attaching the J-hook to an opening in the manhole cover or the handhold enclosure cover;
    applying a downward pressure to the T-bar handle thereby engaging the J-hook with the manhole cover or the handhold enclosure cover and perpendicularly lifting the manhole cover or the handhold enclosure cover; and
    the portable manhole cover and handhold enclosure cover extractor repositioning the manhole cover or handhold enclosure cover.

* * * * *